Patented Dec. 13, 1938

2,140,029

UNITED STATES PATENT OFFICE 2,140,029

HEATING OF BORON COMPOUNDS

Erich Noack, Odenthal, and Friedrich Schubert, Leverkusen-Wiesdorf, Germany, assignors to I. G. Farbenindustrie Aktiengesellschaft, Frankfort-on-the-Main, Germany No Drawing. Application September 23, 1936, Serial No. 102,254. In Germany September 27, 1935

4 Claims. (Cl. 23—149)

This invention relates to a process for avoiding the swelling of solid compounds which show a tendency to swell on heating.

In accordance with the present invention the heating of solid compounds with simultaneous melting, dehydrating, degasing etc. can be effected without any swelling of the substance to be treated taking place, by admixing such a quantity of an indifferent compound that the flowing together of the single particles of the products is avoided. About 10 to about 20 parts by weight of the indifferent substance are sufficient to avoid any swelling or at least to reduce the swelling to a negligible extent. As indifferent substances many compounds can be used. We prefer to use degased carbon, preferably coarsely ground, small pieces of coke, retort carbon or charcoal. Substances tending to swell on heating are, for instance, boric acid and borax.

The invention is further illustrated by the following example without being restricted thereto:

*Example.*—100 kgs. of boric acid are mixed with 10–20% of retort carbon and filled into crucibles up to about the brim. The mixture is rapidly heated to 600° C. It is dehydrated and transformed into boric acid anhydride. Without the addition of carbon the crucible can only be filled up to about one fifth part. Nevertheless dehydration requires the manifold time.

The mixture of boric acid anhydride and carbon obtained in this manner is very well suited for the manufacture of boron carbide in the electric kiln. It is also possible to pretreat the mixture of boric acid and carbon from the beginning in the electric kiln and to transform it by further heating to light white heat into boron carbide.

We claim:—

1. Process for avoiding the swelling up of such solid boron compounds which tend to swell when heated, which comprises heating a mixture of the boron compound which tends to swell in admixture with such an amount of a degased carbon that the single particles of the substance cannot flow together.

2. Process for avoiding the swelling up of such solid boron compounds which tend to swell when heated, which comprises heating a mixture of the boron compound which tends to swell in admixture with about 10 to about 20% by weight of a degased carbon.

3. Process for avoiding the swelling up of boric acid when heated, which comprises heating a mixture of boric acid in admixture with such an amount of a degased carbon that the single particles of the substance cannot flow together.

4. Process for avoiding the swelling up of boric acid when heated, which comprises heating a mixture of boric acid in admixture with about 10 to about 20% by weight of a degased carbon.

ERICH NOACK.
FRIEDRICH SCHUBERT.